United States Patent [19]
Toman

[11] Patent Number: 5,970,690
[45] Date of Patent: Oct. 26, 1999

[54] LEVELING APPARATUS FOR A CUTTING HEAD OF A MOWER

[75] Inventor: Charles R. Toman, Lincoln, Nebr.

[73] Assignee: Ransomes America Corporation, Lincoln, Nebr.

[21] Appl. No.: 08/957,272

[22] Filed: Oct. 24, 1997

[51] Int. Cl.⁶ .......................... A01D 57/04; A01D 34/44
[52] U.S. Cl. .................... 56/7; 56/15.2; 56/249
[58] Field of Search ................ 56/7, 13.6, 15.1, 56/15.2, 249

[56] References Cited

U.S. PATENT DOCUMENTS

| | | |
|---|---|---|
| 3,248,864 | 5/1966 | Barth . |
| 3,410,063 | 11/1968 | Speiser . |
| 3,429,110 | 2/1969 | Strasel . |
| 3,472,005 | 10/1969 | Profenna . |
| 3,511,033 | 5/1970 | Strasel . |
| 3,514,926 | 6/1970 | Heth et al. . |
| 3,613,337 | 10/1971 | Akgulian et al. . |
| 3,905,180 | 9/1975 | Akgulian et al. . |
| 3,918,239 | 11/1975 | Aldred et al. . |
| 3,968,630 | 7/1976 | Mitchell . |
| 4,021,996 | 5/1977 | Bartlett et al. . |
| 4,072,001 | 2/1978 | Aldred . |
| 4,161,858 | 7/1979 | Gerrits . |
| 4,621,696 | 11/1986 | Brouwer . |
| 4,680,922 | 7/1987 | Arnold . |
| 4,769,976 | 9/1988 | Bassett et al. . |
| 4,878,802 | 11/1989 | Hansen et al. . |
| 5,042,236 | 8/1991 | Lamusga et al. . |
| 5,123,234 | 6/1992 | Harada et al. . |
| 5,197,267 | 3/1993 | Aldred et al. . |
| 5,203,151 | 4/1993 | Mills . |
| 5,297,378 | 3/1994 | Smith . |
| 5,343,680 | 9/1994 | Reichen et al. . |
| 5,623,817 | 4/1997 | Bricko et al. . |
| 5,706,638 | 1/1998 | Kinder et al. . |

*Primary Examiner*—H. Shackelford
*Attorney, Agent, or Firm*—Harness, Dickey & Pierce, P.L.C.

[57] ABSTRACT

A leveling apparatus for a reel type cutting head for use on a gang mower. The leveling apparatus includes a linkage which attaches at an inboard end to the frame of the mower and at an outboard end of a control arm. The control arm in turn attaches to the cutting head to pivot the cutting head about a horizontal axis. As the mower is lowered to engage the ground, the linkage pivots the cutting head to maintain the cutting head level as the cutting head is lowered to engage the ground. In a particular embodiment, the linkage comprises a parallel linkage having an upper and a lower link and inboard and outboard control arms which are arranged to form a parallelogram whose shape changes as the mower is raised and lowered. The parallel linkage connects to the cutting head to pivot the cutting head about a horizontal axis and maintains the cutting head substantially level as the cutting head is raised and lowered. The upper and lower links are generally parallel, and the inward and outward control arms are also generally parallel. Further, the inboard and outboard control arms remained in a generally vertical orientation, while the upper and lower links pivot in a generally vertical direction.

16 Claims, 5 Drawing Sheets

LEVELING APPARATUS FOR A CUTTING HEAD OF A MOWER

BACKGROUND OF THE INVENTION

1. Field of the Invention

The present invention relates to riding mowers for use on golf courses and other large grounds, and, more particularly, relates to riding mowers having a mechanism for leveling the cutting heads as they engage the ground.

2. Discussion

The assignee of the present invention manufacturers and sells riding mowers for turf maintenance. More particularly, the assignee sells both electrically and hydraulically operated mowers for turf maintenance. An example of the all-electric riding greens mower is described in detail in the commonly-assigned patents U.S. Pat. No. 5,406,778, issued Apr. 18, 1995; U.S. Pat. No. 5,540,037, issued Jul. 30, 1996; and U.S. Pat. No. 5,553,445, issued Sep. 10, 1996, the disclosures of which are hereby incorporated by reference.

On almost all golf courses, both greens and fairways must be cut to a height which is typically much lower than the average cut height of the lawn which may be found in a typical garden. Most fairways are cut to a height of 0.50 inches, and most greens are cut to a shorter height of approximately 0.18 inches. In order to achieve such low cut heights, greens superintendents typically employ reel mowers as are commonly known in the art. Fairways are normally cut using a gang mower having at least three or more reel type cutting heads trailed behind a tractor or integrated into a riding mower. Previously, most greens were cut using specialized, walking greens mowers operated by a user walking behind the mower. In order to cut costs and to reduce daily maintenance periods in order to maximize golf course usage, more and more golf courses are employing riding greens mowers so that one maintenance person can cut more greens in less time. Such riding greens mowers may either be electric, as described in the above-referenced patents, hydraulic, or a combination of electric and hydraulic.

Whether operating a walking or riding greens mower, the greens superintendent typically guides the mowers to traverse the green in adjacent rows and makes a finish cut around the edge of the golf green. When operating a riding greens mower, as the mower approaches the edge of the green, the operator raises the cutting heads so that the mowing heads do not cut into the fringe of the green. The operator then turns the mower to begin cutting the next, adjacent row. When the mower is in position to begin cutting the adjacent row, the operator lowers the cutting heads onto the green and traverses the green.

Most reel-type cutting heads pivot about a horizontal axis so that they can follow the contour of the green. Although this pivoting motion is desirable while the mower engages the ground, this motion may be undesirable while the cutting head is being lowered to actually engage the ground. Preferably, the mower is completely level just as it contacts the ground. When the mower is not level, the side of the mower striking the ground first bounces upward from the green causing the opposite side to lower to the green. This opposite also bounces upward causing the first side to rebound before the mower settles onto the green. This bounce and rebound effect sometimes results in the reels of the cutting head undesirably scalping the green as it engages the ground.

This phenomena is further exacerbated by the present typical design of both electric and hydraulic riding greens mowers. In most riding greens mower, the cutting heads, whether left front, right front, or center cutting heads, are substantially identical. The cutting heads attach to the reel mower via a pull frame, and a motor, whether electric or hydraulic, mounts to one side of the cutting head for driving the reel. This arrangement typically requires an initial, static balancing in order to counter-balance the weight of the hydraulic or electric motor. Further, the motors often have either electric or hydraulic control lines which exert dynamic forces which may change during the raising and lowering of the cutting head.

When the cutting heads are raised and lowered, the forces exerted by the electric or hydraulic lines attached to the motor may vary the balance of the cutting head dynamically, causing the cutting head to rock or sway about a horizontal pivot point. These forces cannot be counter-balanced by merely using weights at an opposite of the mower. This minor change in dynamic balance may result in the above-described scalping phenomenon. Further, with respect to a triplex mower, the left front and right front cutting heads often have different balance characteristics because of various routings of hydraulic or electrical control lines and because of different characteristics exhibited by the left and right front cutting heads when raised. This problem may be further exacerbated when raising or lowering the mower heads while completing a left hand or right hand turn, depending upon the design of the particular mower and inertial forces introduced during the turning operation. The cumulative effect of these dynamic imbalances is a sway of the mower head about a horizontal axis during the lowering operation. This sway may result in the above-described scalping effect.

Therefore, it is an object of the present invention to provide a leveling mechanism which maintains the cutting head substantially level when the cutting head is off the ground.

It is a further object of the present invention to provide a leveling mechanism which maintains the cutting head substantially level as the cutting head engages the ground and as the cutting head disengages the ground.

It is yet a further object of the present invention to provide a linkage for maintaining the cutting head substantially level as the cutting head is lowered to engage the ground.

It is yet a further object of the present invention to provide a parallel linkage for maintaining the cutting head substantially level as the cutting head engages the ground.

SUMMARY OF THE INVENTION

This invention is directed to a self-propelled riding mower comprising a vehicle frame supported on a plurality of ground engaging wheels. The frame supports a reel-type cutting head which is moveable between a raised non-operative position and a lowered operative position in which the cutting head engages the ground. A leveling assembly is connected to the cutting head and to the vehicle frame. The leveling assembly includes a linkage which maintains the cutting head substantially level when the cutting head is lowered to engage the ground. Further, a prime mover provides driving torque to at least one of the ground engaging wheels.

In another embodiment of the present invention, the linkage which maintains the cutting head substantially level includes a pair of generally horizontal links that pivot relative to the frame and to cutting head. The linkage also includes a pair of generally vertical control arms that connect the links. The links interconnect to define a parallelogram having a shape which varies in accordance with movement of the cutting head. Further, at least one of the pair of links raises and lowers the cutting head between the raised non-operative position and the lowered operative position. Further yet, the pair of links are substantially parallel and the same length, and the pair of control arms are substantially parallel and substantially the same length.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE PREFERRED EMBODIMENTS

The present invention is directed to an apparatus for leveling the cutting head of a gang mower. For purposes of providing a detailed description of the preferred embodiments of this invention, the invention is described as a hydraulic, triplex greens mower having a frame supported on three wheels, three reel type cutting heads supported from the frame member, an operator station including a seat from which an operator controls the function of the mower, and an on-board power source of hydraulic fluid pressure. It should be readily understood that the teachings of the present invention are not limited to the specific type of mower described herein and can be extended to a variety of gang mowers having reel type cutting heads. Such mowers include both electric and hydraulic mowers or combination electro-hydraulic mowers.

Figure 1:
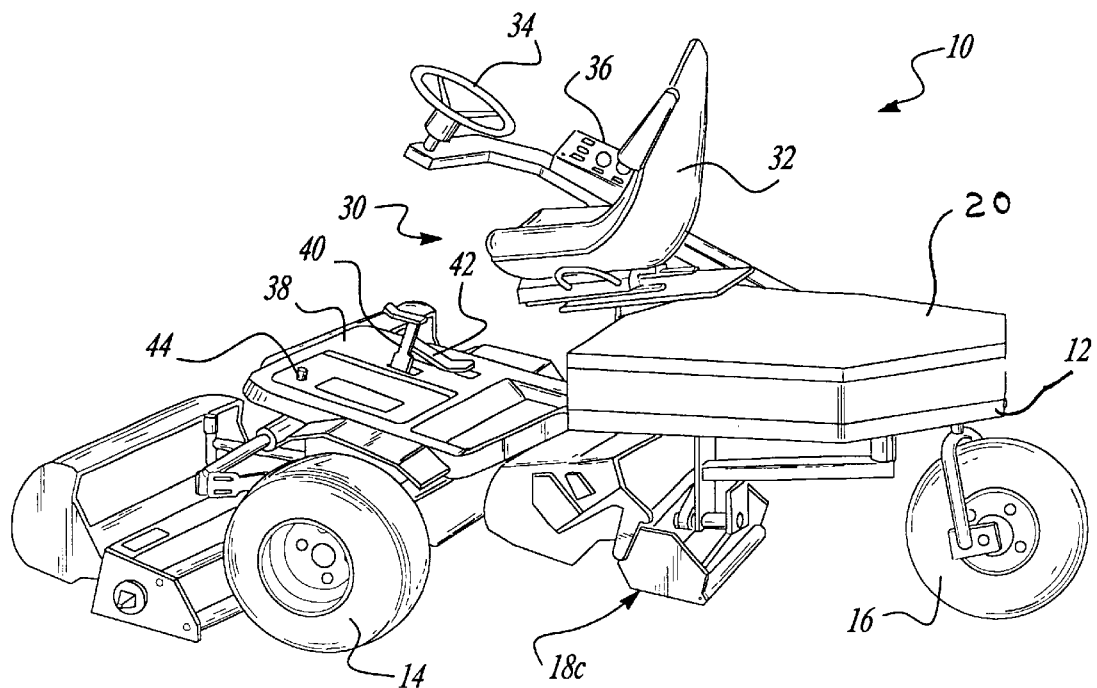
FIG. 1 is a left perspective view of a riding greens mower.
Figure 2:
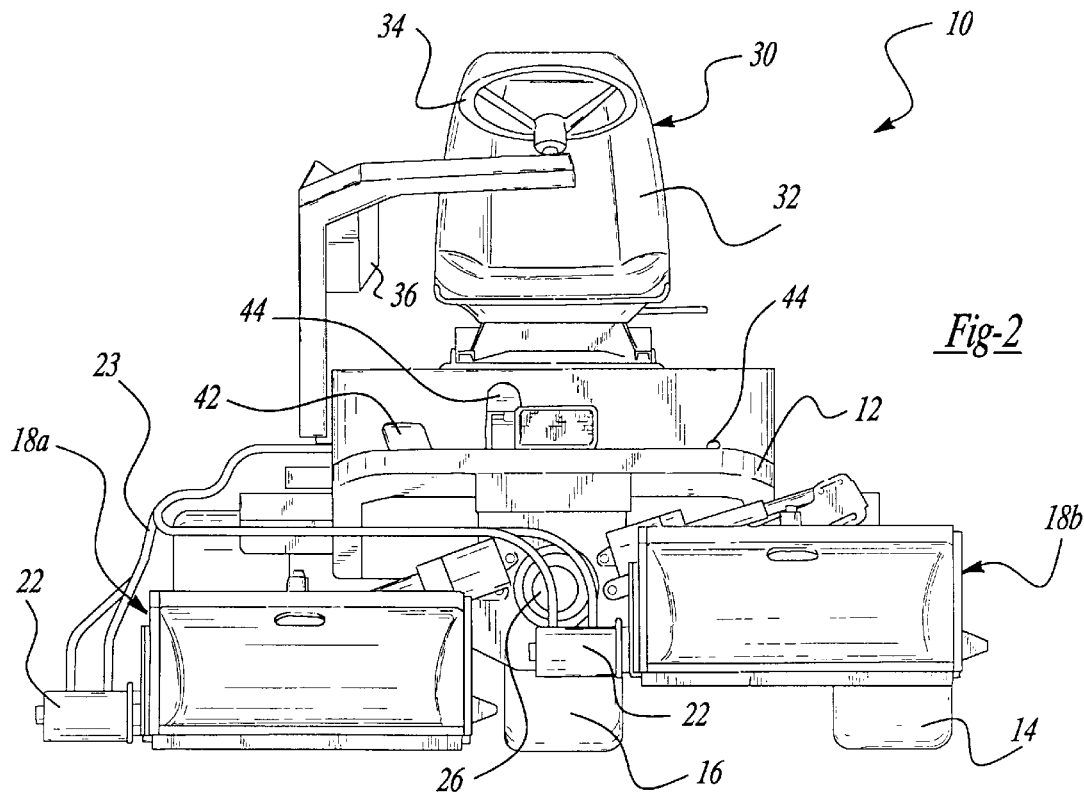
FIG. 2 is a front view of the drive riding greens mower of FIG. 1 illustrating various components of the mower including the reel type cutting heads.
Figure 3:
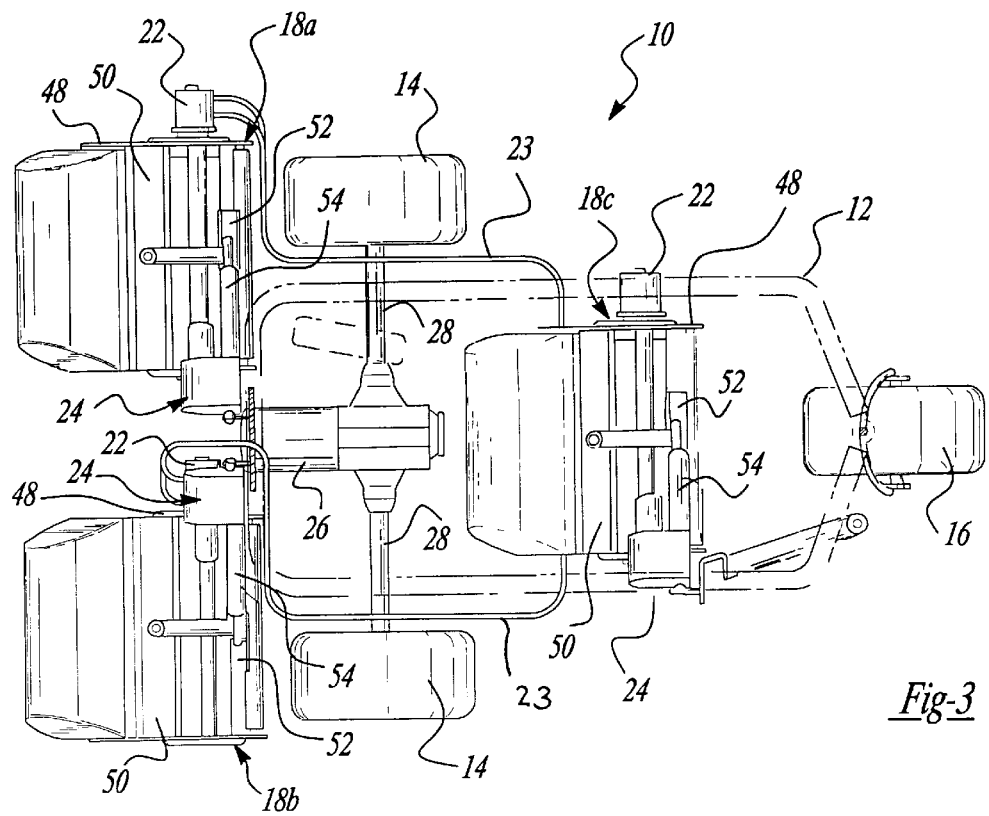
FIG. 3 is a top view of the riding greens mower illustrating features of the mower generally disposed below the frame member.

FIGS. 1–3 illustrate the general arrangement of a hydraulic riding mower 10. The mower 10 includes a frame 12 supported for movement on a pair of drive wheels 14 and on a rear steerable wheel 16. Two reel type cutting head assemblies 18a and 18b, are disposed at the forward corners of frame 12 and a third reel type cutting head assembly 18c is centrally disposed below frame 12. The mower 10 includes a hydraulic power source 20 which generates hydraulic fluid pressure for operating reel and primary motors to operate the mower 10. Each cutting head assembly 18a–18c is driven by its own hydraulic reel motor 22 and each cutting head assembly 18a–18c is capable of being individually raised or lowered by its own lift assembly 24, which may be either electric or hydraulic. The motors 22 receive hydraulic fluid pressure from hydraulic power source 20 through hydraulic lines 23. Hydraulic power source 20 also provides hydraulic fluid pressure to a primary mover, hydraulic motor 26, which is adapted to provide driving torque through drive axle 28 to each drive wheel 14 for propelling mower 10.

Supported also on frame 12 is an operator control station 30 which primarily includes a seat assembly 32, a steering wheel 34, and a control panel 36. Steering drive components (not shown) are connected to steering wheel 34 and allow the operator to control steerable wheel 16. A foot deck 38 is also provided and includes brake pedal 40, directional control pedal 42, and reel motor activation switch (mow switch) 44, each of which are ergonomically positioned for operator comfort and ease of operation. It will be appreciated that the previously mentioned components are discussed in greater detail in the Applicant's previously referenced U.S. patents.

Lift assemblies 24 connect to cutting heads 48 of cutting head assemblies 18a, 18b, and 18c. Each cutting head 48 is mounted to a pull frame 50, shown in FIG. 4. Pull frame 50 attaches to a lift arm 52. The height of lift arm 52 is determined by the position of a cylinder 54 which is shown herein as a hydraulically controlled cylinder, but may be electric or a combination electro-hydraulic cylinder. The cylinders are controlled by the lift assemblies 24.

Figure 4:
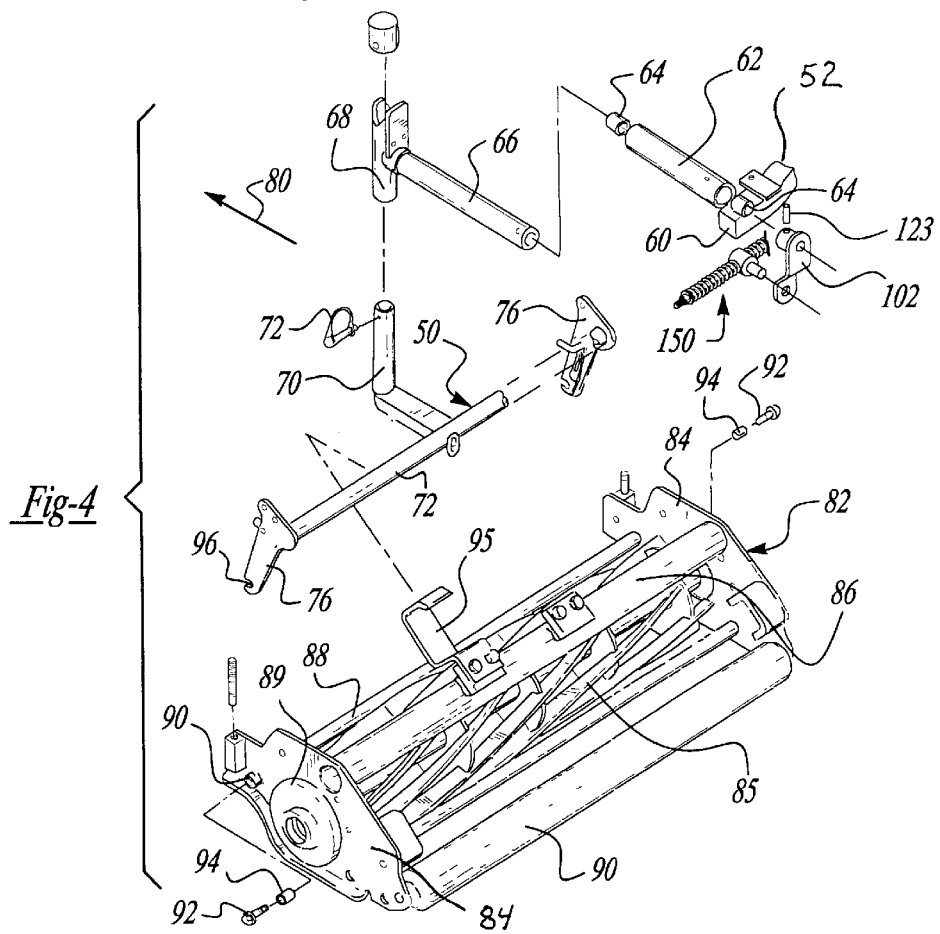
FIG. 4 is an exploded, perspective view of an exemplary cutting head maintained substantially level by the present invention.

FIG. 4 depicts an exploded view of the attachment between cutting head 48, pull frame 50, and a portion of lift arm 52. Lift arm 52 includes transverse section 60 and longitudinal section 62 welded to transverse section 60. Longitudinal section 62 is a tubular section having a pair of bushings 64 press-fit into the interior of longitudinal section 62. A pivot shaft 66 is inserted within the interior of bushings 64 and longitudinal section 62. A vertical cylinder 68 attaches to the end of pivot shaft 66. Vertical cylinder 68 receives a spindle 70 which is inserted into vertical cylinder 68 and locked in place by linchpin 72. Thus, cutting head 48 rotates about a vertical axis defined by spindle 70 and a horizontal axis defined by pivot shaft 66. Further, the pull frame 50 is attached to cutting head 48 so that the pull frame 50 pulls the cutting head 48 in a forward direction demonstrated by the arrow 80 of FIG. 4.

Cutting head 48 includes a plurality of components to effect the grass cutting operation. The general structure of cutting head 48 will be known to those skilled in the art and will not be described in detail. Briefly, reel type cutting head 48 of FIG. 4 includes a frame 82 which comprises a pair of side plates 84 connected by crossrod 86, such as through a welding process. A reel type blade 85 is positioned within the frame 82 between a pair of spring-loaded housings 89 which enable rotational movement of blade 85 and limited transverse movement of the blade 85 as well. Cutting head 48 contacts the ground via a roller 90 mounted between side plates 84 of frame 82. A second crossrod 88 is also welded between side plates 84 of frame 82. Crossrod 88 has threaded ends 90. A bolt 92 is threaded into each threaded end 90 and secures a bushing 94 onto each end of crossrod 88. To assemble pull frame 50 and cutting head 48, each bushing 94 at the ends of crossrod 88 is inserted into horizontal slot 96 formed in each vertical plate 76 of pull frame 50. Once bushings 94 are inserted and secured in slots 96, the weight of cutting head 48 causes rotational movement in a counter clockwise direction about an axis defined by crossrod 88. In order to limit rotation, a hook 95 attaches to horizontal crossrod 86 and engages the crossbar 72 of the pull frame 50 to limit rotational movement.

Figure 5:
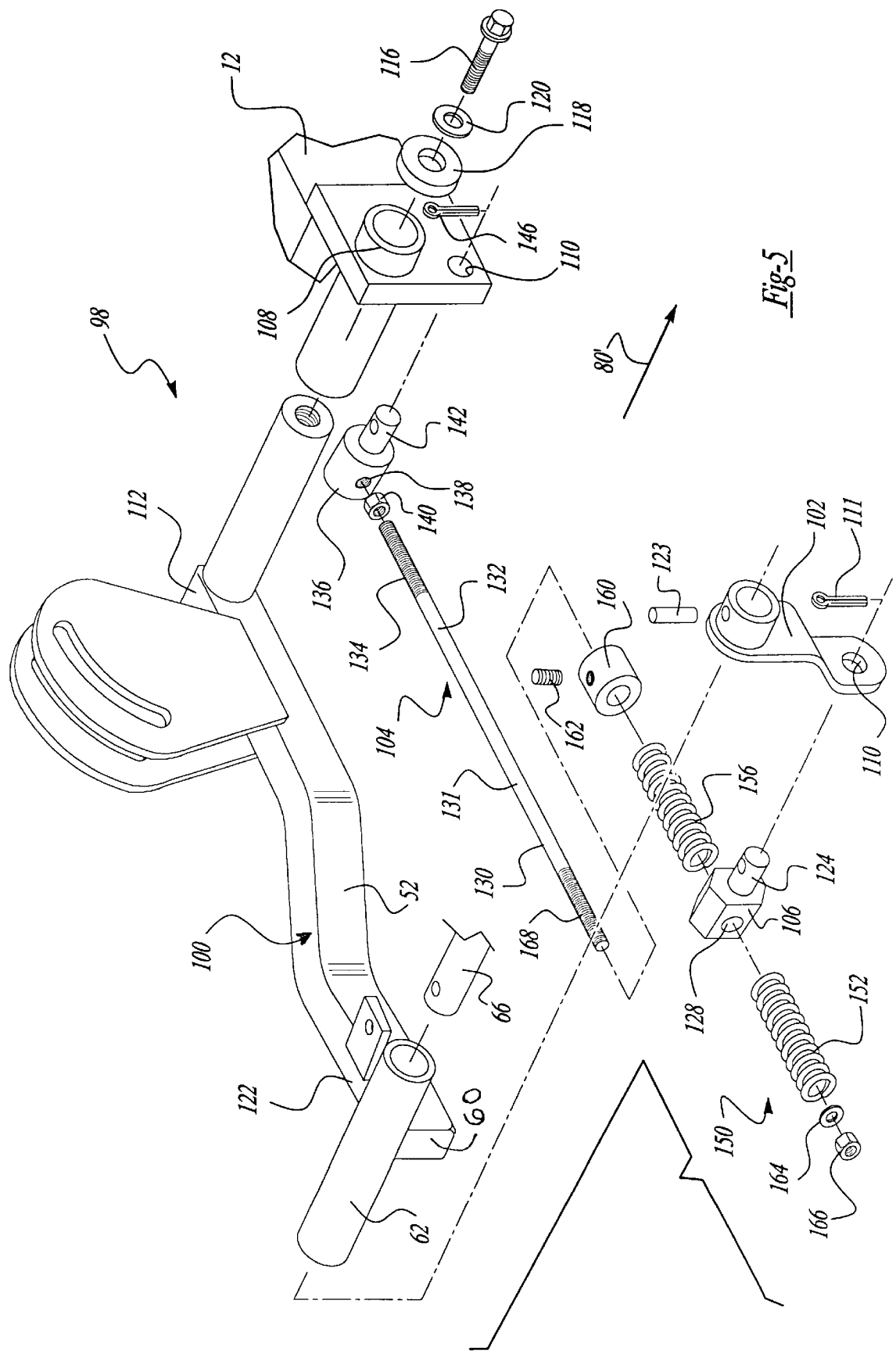
FIG. 5 is an exploded, perspective view of the parallel linkage arranged in accordance with the principles of the present invention.
Figure 6A:
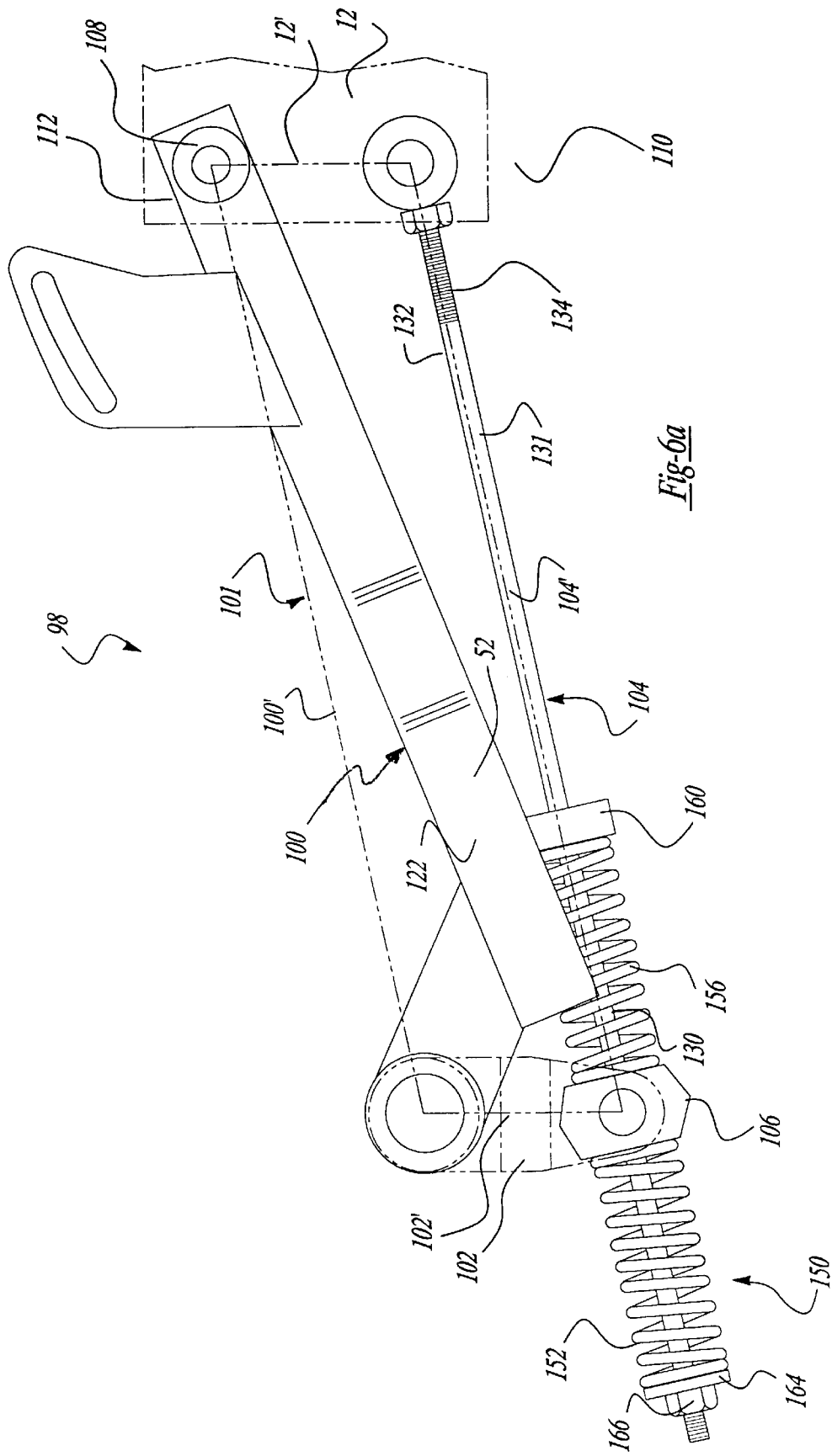
FIGS. 6A and 6B are elevational views of the parallel linkage shown with the cutting head in a lowered and raised position, respectively.
Figure 6B:
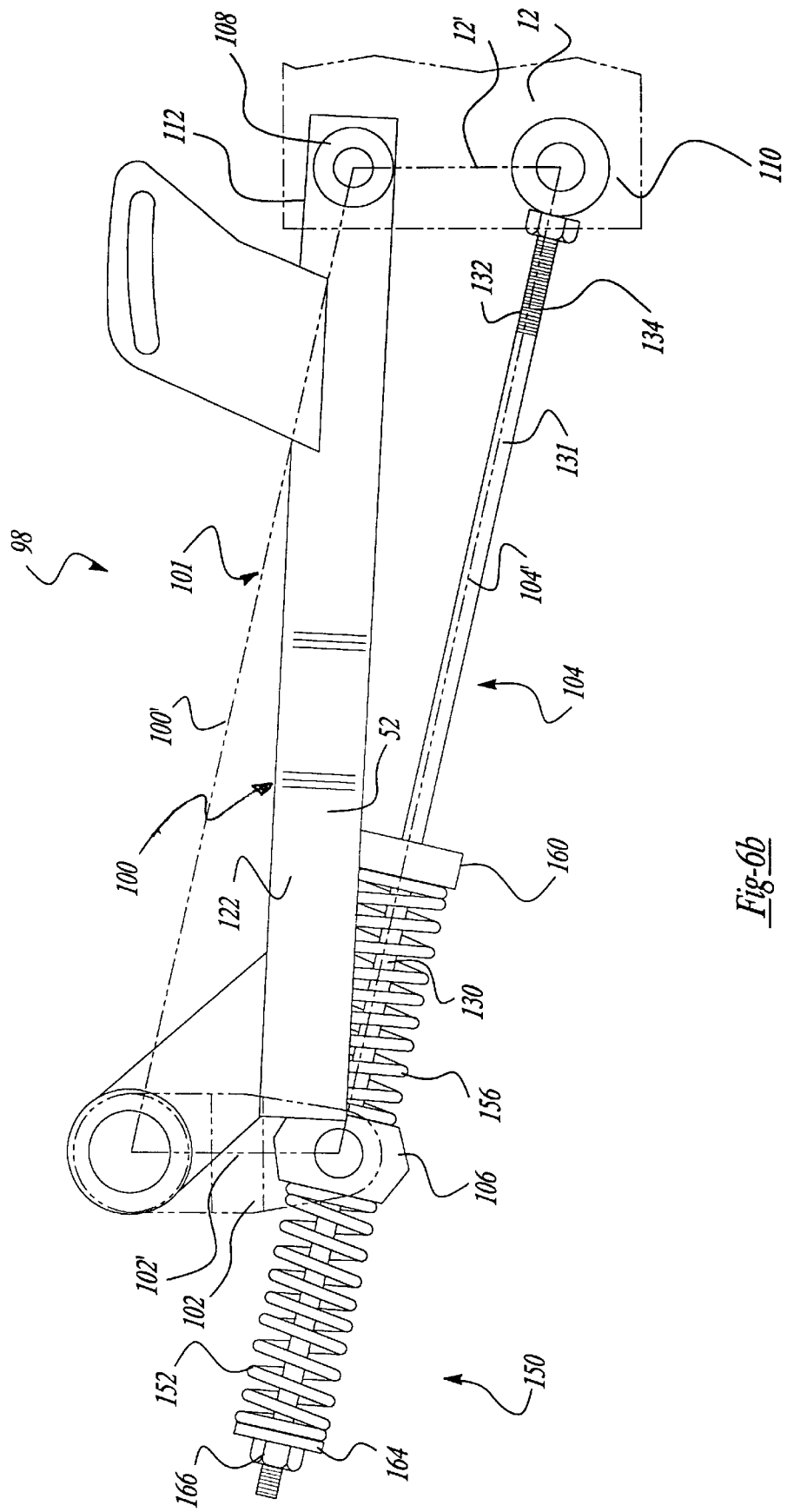

FIGS. 5, 6A and 6B illustrate the key aspects of the apparatus for leveling cutting head 48. Note that to better depict the present invention, the orientation of FIGS. 5, 6A, and 6B has been reversed from FIG. 4. Thus the direction of forward travel for mower 10 is shown in FIG. 5 by arrow 80', while FIGS. 6A and 6B show front elevational views of the present invention. As will be described herein, the apparatus is embodied as a parallel linkage in which an inboard and outboard control arm and an upper and lower link form a parallelogram. The inboard control arm is generally vertically aligned and fixed so that the upper and lower link attach to the inboard control arm pivots about the respective attachment points. The upper and lower links are generally horizontal, are a fixed length, and connect to an outboard control arm which attaches to cutting head 48 to allow pivotal movement with respect to the upper and lower links. In this manner, the cutting head 48 remains level.

With reference to FIGS. 5, 6A, and 6B, outboard control arm 102 is embodied as a bell crank. Outboard control arm attaches to an upper link assembly 100. Upper link assembly 100 includes primarily lift arm 52 for cutting head 48. At the other end of bell crank 102, lower link assembly 104 connects to bell crank 102 via connector 106, as will be described in greater detail herein. At the inboard end of the link assemblies 100, 102, upper link assembly 100 attaches to frame 12 at pivot point 108. Similarly, the inboard end of lower link assembly 104 attaches to frame 12 at pivot point 110 via a connector 136 having a pin 142 which is engaged by cotter pin 146. Connector 136 threadably engages lower link 104, as will be described herein. In this manner, upper link assembly 100, outboard control arm or bell crank 102, and lower link assembly 104 corresponds to three links of the parallel linkage. The fourth link of the parallel linkage is found with respect to the frame 12 and the separation distance between pivot points 108 and 110.

Further, as shown in FIGS. 6A and 6B, each link of the parallel linkage defines a leg of an imaginary parallelogram 101 in which upper link assembly 100 defines a leg 100', outboard control arm 102 defines leg 102', lower assembly link 104 defines leg 104', and inboard control arm defines leg 12'. Pivot points 108 and 110 engage the frame 12 and are fixed in a vertical orientation. Similarly, as will be described further herein, because link assemblies 100, 104 are substantially equal length, outboard control arm or bell crank 102 remains substantially vertical. Further, control arm 102 (leg 102') and the distance between pivot points 108 and 110 (leg 12') are also of equal length. Bell crank 102 in turn rigidly attaches to pivot shaft 66 of pull frame 50 in order to maintain cutting head 48 in a substantially level orientation. The length of each leg 100', 102', 104', and 12' remains substantially constant.

Inboard end 112 of upper link assembly 100 attaches to the frame 12 at pivot point 108. Bolt 116 which threads through wave washer 118 and flat washer 120 to retain inboard end 112 to pivot point 108. The shaft engagement allows pivotal movement about pivot point 108. At the outboard end 122 of upper link assembly 100, pivot shaft 66 passes through longitudinal section 62 and engages bell crank 102 through a pin 123. At the lower end of bell crank or outboard control arm 102, connector 106 includes a pin 124 which engages a hole 110 and is held in place by cotter pin 111. Connector 106 includes a cylindrical portion 128 which is engaged by the outboard end 130 of crossrod 131. The inboard end 132 of crossrod 131 includes a threaded section 134 which threadably engages the threads 138 of connector 136. Connector 136 includes a pin 142 which engages lower pivot point 1 10 and is held in place by cotter pin 146. Through threaded engagement of crossrod 131 and connector 136, the effective length of lower link assembly 104 (leg 104') of parallelogram 101 may be varied so that leg 104' is the same effective length as upper link assembly 100 (leg 100'). This equalizes the lengths of legs 100' and 104' of parallelogram 101. Jam nut 140 locks crossrod 131 to connector 136 once the proper length has been established.

At outboard end 130 of lower link assembly 104, connector 106 is assembled to enable limited travel along crossrod 131. Accordingly, connector 106 includes a tubular section 128 engaged by outboard end 130 of crossrod 131. Connector 106 is a component of a compression spring assembly 150 which allows for limited travel of connector 106 along crossrod 131. This enables limited movement of bell crank 102, thereby enabling cutting head 48 to pivot accordingly to better follow the contours of the turf. A tilting force applied to cutting head 48 during the mowing operation causes a pivoting motion of cutting head 48 through compression spring assembly 150.

Compression spring assembly 150 includes a first spring 152 and a second, opposing springs 156. Opposing spring 152 and 156 are embodied as coil springs through which passes the outboard end 130 of crossrod 131. A collar 160 is placed inboard of the compression spring 156 and is held in place by set screw 162 to provide a seat for compression spring 156. At the outboard end, washer 164 and nut 166 provide a spring seat for spring 152. The nut 166 threadably engages threaded section 168 of crossrod 131. Nut 166 also enables proper adjustment of compression spring 152 and 156 to provide sufficient resistance to pivoting forces on cutting head 48.

As can be seen in FIGS. 6A and 6B, upward or downward movement of the lift arm 52 does not affect the level orientation of cutting head 48 because the bell crank 102 remains substantially vertically oriented through the parallel linkage 101 described herein. As can also be seen in FIGS. 6A and 6B, as lift arm 52 moves to raise or lower cutting head 48, parallelogram 101 merely changes shape, but remains a parallelogram with legs 100' and 104' remaining equal and constant and legs 102' and 12' remaining equal and constant. Further, the present invention enables adjustment of the effective length of the lower link assembly 104 by varying the engagement of the threads 134 at the inboard and 132 of lower link assembly 104. Further, through compression spring assembly 150, sufficient pivotal forces applied to cutting head 48 enables cutting head 48 to respond in order to follow contours of the ground.

While specific embodiments have been shown and described in detail to illustrate the principles of the leveling mechanism for a cutting head, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A self-propelled riding mower comprising:
   a vehicle frame supported upon a plurality of ground engaging wheels;
   a reel type cutting head supported from the frame, the cutting head being moveable between a raised nonoperative position and a lowered operative position in which the cutting head engages the ground;
   a leveling assembly operatively connected to the cutting head and operatively connected to the vehicle frame, the leveling assembly including a linkage which maintains the cutting head substantially level when the cutting head is lowered to engage the ground wherein the linkage includes a pair of generally horizontal links, defined as an upper link and a lower link, that pivots relative to the vehicle frame and cutting head, the upper link and lower link connecting to and pivoting with respect to the vehicle frame at the respective inboard ends, and the lower link threadably attaching to the frame at the inboard end so that the lower link has a length which may be varied in accordance with the length of the upper link, wherein the upper and lower control links are substantially the same length, and the linkage further includes a pair of generally vertical control arms connecting the links; and a prime mover adapted to provide driving torque to at least one of the ground engaging wheels.

2. The self-propelled riding mower of claim 1 wherein the links and control arms interconnect to define a parallelogram having a shape which varies in accordance with movement of the cutting head.

3. The self-propelled riding mower of claim 1 wherein at least one of the pair of links raises and lowers the cutting head between the raised non-operative position and the lowered operative position.

4. The self-propelled riding mower of claim 1 wherein one of the control arms is operatively connected to the cutting head and pivots relative to the links to maintain the cutting head substantially level.

5. The self-propelled riding mower of claim 1 wherein each of the pair of links are substantially parallel and substantially the same length, and each of the pair of control arms are substantially parallel and substantially the same length.

6. The self-propelled riding mower of claim 1 wherein each of the pair of links have an inboard end and an outboard end, and the inboard ends of each link connect to the vehicle frame, and wherein the pair of control arms define an inboard and outboard control arm, wherein a section of the frame separating the inboard ends of the links defines the inboard control arm and the outboard control arm connects the outboard ends of the links.

7. The self-propelled riding mower of claim 1 wherein the upper link raises and lowers the cutting head between the raised non-operative position and the lowered operative position and the lower link connects to the cutting head through a control arm to pivot the cutting head to a substantially level position.

8. The self-propelled riding mower of claim 1 wherein the outboard end of the lower link is connected to an outboard control arm via a compliance assembly that enables the cutting head to pivot upon application of a force, thereby allowing the cutting head to maintain engagement with the ground.

9. The self-propelled riding mower of claim 8 wherein the compliance assembly comprises a centering spring assembly having a pair of opposing springs that enable movement of the outboard end of the lower link.

10. The self-propelled riding mower of claim 1 wherein the links are generally non-parallel.

11. The self-propelled riding mower of claim 1 wherein the leveling assembly further comprises a link having an inboard end attached to the vehicle frame and an outboard end, the link causing pivotal movement of the cutting head to maintain the cutting head substantially level when lowered to engage the ground.

12. A leveling apparatus for a cutting head of a gang mower, where the cutting head may be moved from a raised non-operative position and a lowered operative position, comprising:

a pair of links which are generally horizontal and pivot relative to the vehicle frame and cutting head; and a pair of control arms which are generally vertical and connect the links; wherein the lower link threadably attaches to the frame at the inboard end so that the lower link has a length which may be varied in accordance with the length of the upper link and wherein the upper and lower control links are substantially the same length.

13. The apparatus of claim 12 wherein the links and control arms interconnect to define a parallelogram having a shape which varies in accordance with movement of the cutting head between the raised non-operative position and the lowered operative position.

14. The self-propelled riding mower of claim 12 wherein each of the pair of links includes an inboard end and an outboard end, the pair of links further comprising:

an upper link;

a lower link;

wherein the upper link and lower link connect to and pivot with respect to the vehicle frame at the respective inboard ends.

15. The self-propelled riding mower of claim 12 wherein the upper link raises and lowers the cutting head between the raised non-operative position and the lowered operative position, and the lower link connects to the cutting head through one of the control arms to pivot the cutting head to a substantially level position.

16. The self-propelled riding mower of claim 12 wherein the outboard end of the lower link is connected to an outboard control arm via a compliance assembly that enables the cutting head to pivot upon application of a force, thereby allowing the cutting head to maintain engagement with the ground.

* * * * *